(12) United States Patent
Shivarudra Gowda

(10) Patent No.: US 12,054,285 B2
(45) Date of Patent: Aug. 6, 2024

(54) HEAT CONTAINMENT METHOD FOR AIRCRAFT TAIL LIGHTING

(71) Applicant: GOODRICH CORPORATION, Charlotte, NC (US)

(72) Inventor: Harish Shivarudra Gowda, Bengaluru (IN)

(73) Assignee: GOODRICH CORPORATION, Charlotte, NC (US)

(*) Notice: Subject to any disclaimer, the term of this patent is extended or adjusted under 35 U.S.C. 154(b) by 133 days.

(21) Appl. No.: 17/843,178

(22) Filed: Jun. 17, 2022

(65) Prior Publication Data

US 2023/0124624 A1 Apr. 20, 2023

(30) Foreign Application Priority Data

Oct. 14, 2021 (IN) .............................. 202141046884

(51) Int. Cl.
*B64D 47/06* (2006.01)
*B64D 41/00* (2006.01)

(52) U.S. Cl.
CPC ........ *B64D 47/06* (2013.01); *B64D 2041/002* (2013.01); *B64D 2203/00* (2013.01)

(58) Field of Classification Search
CPC ........ B64D 47/02–06; B64D 2041/002; B64D 2203/00
See application file for complete search history.

(56) References Cited

U.S. PATENT DOCUMENTS

| | | | |
|---|---|---|---|
| 6,191,541 B1 | 2/2001 | Patel et al. | |
| 6,483,254 B2 * | 11/2002 | Vo ........................... | F21V 29/87 340/815.45 |
| 7,118,261 B2 * | 10/2006 | Fredericks ............. | B64D 47/06 362/249.14 |
| 8,956,021 B2 | 2/2015 | Hessling | |
| 9,771,168 B2 | 9/2017 | Hessling | |
| 10,343,793 B2 | 7/2019 | Hessling-Von Heimendahl et al. | |

OTHER PUBLICATIONS

European Patent Office, European Search Report dated Feb. 17, 2023 in Application No. 22201372.4.

* cited by examiner

*Primary Examiner* — Jason M Han
(74) *Attorney, Agent, or Firm* — SNELL & WILMER L.L.P.

(57) ABSTRACT

The disclosure addresses an external lighting unit for an aircraft. This external lighting unit includes a lighting unit housing have a mounting flange that is configured to provide a reduced contact with a supporting structure (e.g., a tail cone of an aircraft), which in turn reduces conductive heat transfer between the supporting structure and the lighting unit housing (more specifically reduces conductive heat transfer between the supporting structure and a printed circuit board that is disposed within the lighting unit housing and that may be seated on a portion of the lighting unit housing). Open spaces on the surface of the mounting flange that face toward the supporting structure may be occupied by a thermal insulator.

16 Claims, 9 Drawing Sheets

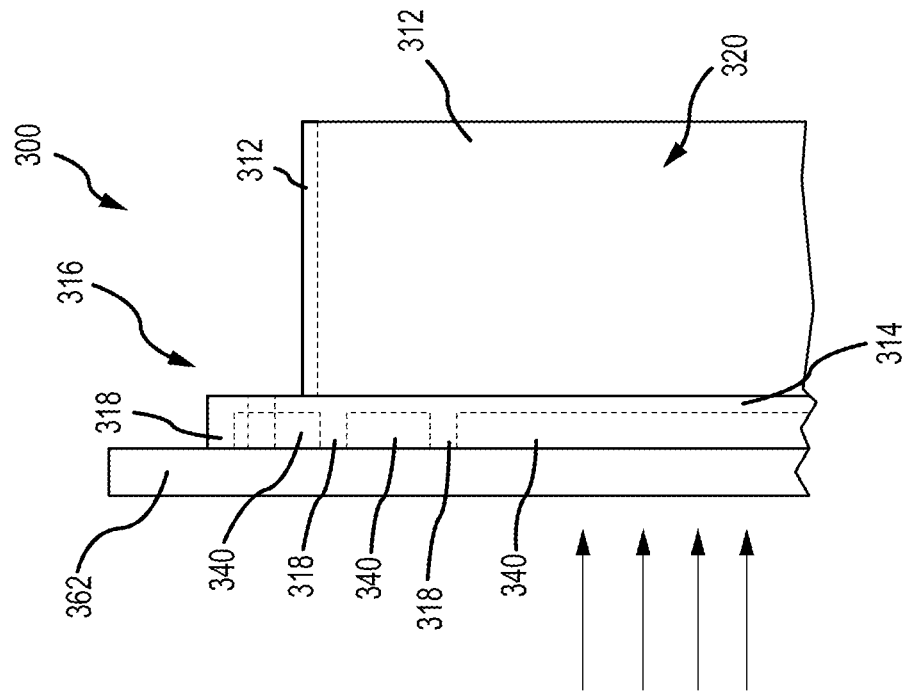
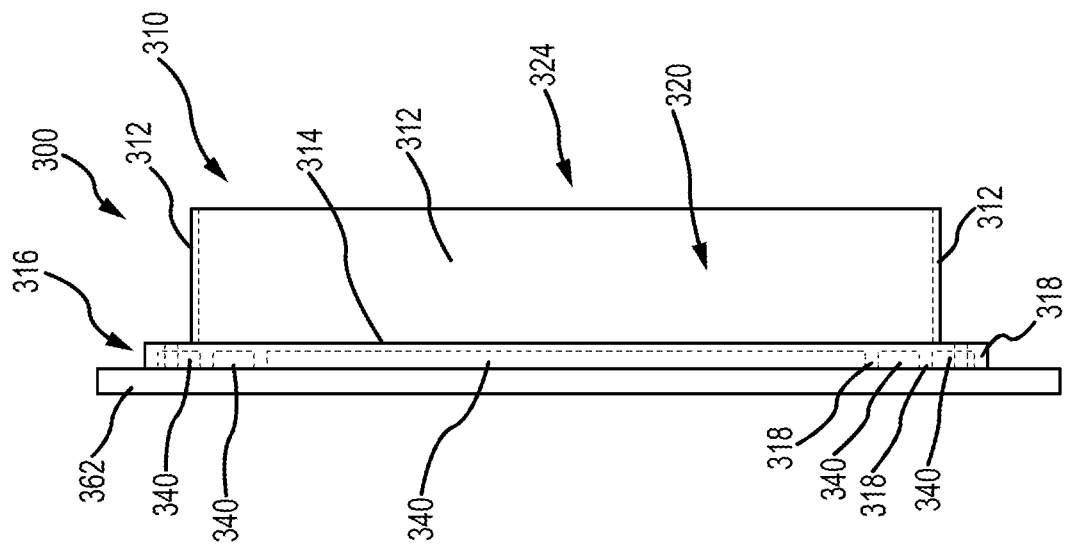

HEAT CONTAINMENT METHOD FOR AIRCRAFT TAIL LIGHTING

CROSS-REFERENCE TO RELATED APPLICATIONS

This application claims priority to, and the benefit of, India Patent Application No. 202141046884, filed Oct. 14, 2021 (DAS Code 0FC3) and titled "HEAT CONTAINMENT METHOD FOR AIRCRAFT TAIL LIGHTING," which is incorporated by reference herein in its entirety for all purposes.

FIELD

The present disclosure generally relates to the field of aircraft lighting and, more particularly, to aircraft lighting incorporated by a tail cone of the aircraft.

BACKGROUND

Almost all aircraft are equipped with exterior lights. In particular, large passenger airplanes are provided with a wide variety of exterior lights. The exterior lights are provided for various different purposes, such as for allowing the passengers and/or air crew to view the outside, for passive visibility, for signaling purposes, and the like. Examples of such exterior lights include navigation lights, also referred to as position lights, anti-collision lights, landing lights, taxi lights, runway turn-off lights, and the like.

Light emitting diodes or LEDs are a potential kind of light source for exterior aircraft lights. They are commonly mounted on a mounting board that is adapted for the arrangement and connection of electronic components. Such a mounting board may be a printed circuit board (PCB). There are a number of issues around the use of such printed circuit boards. For example, electric connectors of the PCB and, potentially, other electronic components may be subject to undesired electrostatic discharge. As another example, excessive heat may be built up at the printed circuit board during operation. The foregoing issues are particularly severe in exterior aircraft lights, as they are required to operate in hazardous conditions. Depending on their location on the aircraft, they may have to withstand large aerodynamic forces, strong vibrations, large temperature variations and/or hazardous gases, such as exhaust fumes.

SUMMARY

An external aircraft light (e.g., tail light) is presented herein. Both the configuration of such an external aircraft light and the operational characteristics/operation, assembly, and manufacture of such an external aircraft light are within the scope of this Summary.

A first aspect is directed to an aircraft tail cone assembly that includes a tail cone and a lighting unit that is mounted on the tail cone. The lighting unit includes a lighting unit housing, at least one light source (e.g., disposed within an interior of the lighting unit; enclosed within the lighting unit), a proximal end that is at least one of disposed in closely-spaced or interfacing relation with the tail cone (e.g., the entirety of the proximal end may interface with the tail cone; one or more portions of the proximal end may interface with the tail cone, one or more portions of the proximal end may be disposed in closely-spaced relation to the tail cone, and any combination thereof), a mounting flange, and a thermal insulator. The proximal end comprises both the mounting flange and the thermal insulator, with the thermal insulator having a lower thermal conductivity than the thermal conductivity of the mounting flange.

A number of feature refinements and additional features are applicable to the first aspect. These feature refinements and additional features may be used individually or in any combination. The following discussion is applicable to the first aspect, up to the start of a discussion of a second aspect. The lighting unit may be installed on any appropriate surface of the tail cone (e.g., an end section or end surface of the tail cone, including any discharge housing incorporated by the tail cone), including in proximity to an exhaust outlet of the tail cone. An auxiliary power unit may be disposed within the tail cone and its exhaust may be directed through at least one exhaust outlet of the tail cone (e.g., a discharge housing at a distal end of the tail cone, where this discharge housing includes at least one exhaust outlet).

The thermal insulator may be of any appropriate configuration, including being formed in a number of different sections. The thermal conductivity of the thermal insulator may be at least about 80% less than a thermal conductivity of the mounting flange in various embodiments. The thermal conductivity of the thermal insulator may be at least about 98% less than a thermal conductivity of the mounting flange in various embodiments. At least about 50% of a surface area of the proximal end of the lighting unit (e.g., a mounting end of the lighting unit) may be defined by the thermal insulator in various embodiments, while at least about 75% of a surface area of the proximal end of the lighting unit may be defined by the thermal insulator in various embodiments. The proximal end of the lighting unit may be an at least substantially flat surface.

The mounting flange may be part of the lighting unit housing, the lighting unit housing may be of an integral or one-piece construction, or both. The mounting flange may include a base and at least one support that extends from this base in a direction of the portion of the tail cone to which the lighting unit is mounted. The thermal insulator may also extend from the base in a direction of the portion of the tail cone to which lighting unit is mounted. The thermal insulator may occupy a space between at least one pair of supports for the mounting flange, and thereby may occupy a space between each adjacent pair of supports for the mounting flange.

A printed circuit board (or circuit board assembly) may be disposed within the lighting unit (e.g., within an interior of the lighting unit; the printed circuit board may be enclosed within the lighting unit). The light source(s) may be at least operatively interconnected with this printed circuit board, including where the light source(s) is disposed on/mounted to the printed circuit board. The printed circuit board may be disposed on the above-noted base of the mounting flange. The printed circuit board and the thermal insulator may be disposed on opposite sides of the above-noted base of the mounting flange.

A second aspect is directed to an exterior aircraft lighting unit that includes a lighting unit housing, at least one light source, a cover, and a thermal insulator. The lighting unit housing includes a mounting flange having at least one open space or pocket that projects in a direction of a structure when the lighting unit is in an installed configuration (e.g., when the lighting unit is mounted on/to such a structure, such as an aircraft tail cone). An output from the light source(s) is directed through the cover. The cover and mounting flange may define at least in part opposite ends of the lighting unit. The thermal insulator is disposed within one or more of the noted open spaces of the mounting flange.

Features addressed in relation to the first aspect may be used by the second aspect, and vice versa.

Various aspects of the present disclosure are also addressed by the following paragraphs and in the noted combinations:

1. An aircraft tail cone assembly, comprising:
   a tail cone; and
   a lighting unit mounted on said tail cone, wherein said lighting unit comprises:
      a lighting unit housing;
      at least one light source disposed within said lighting unit;
      a proximal end in at least one of closely-spaced or interfacing relation with said tail cone;
      a mounting flange, wherein said proximal end comprises said mounting flange; and
      a thermal insulator, wherein said proximal end further comprises said thermal insulator, wherein said thermal insulator has a lower thermal conductivity than a thermal conductivity of said mounting flange.

2. The aircraft tail cone assembly of paragraph 1, wherein said thermal conductivity of said thermal insulator is at least about 80 percent less than said thermal conductivity of said mounting flange.

3. The aircraft tail cone assembly of paragraph 1, wherein said thermal conductivity of said thermal insulator is at least about 98 percent less than said thermal conductivity of said mounting flange.

4. The aircraft tail cone assembly of any of paragraphs 1-3, wherein said mounting flange and said thermal insulator are formed from different materials.

5. The aircraft tail cone assembly of any of paragraphs 1-4, wherein said mounting flange comprises at least one of a metal or a metal alloy.

6. The aircraft tail cone assembly of any of paragraphs 1-5, wherein said lighting unit housing comprises said mounting flange.

7. The aircraft tail cone assembly of any of paragraphs 1-6, wherein at least 50% of a surface area of said proximal end of said lighting unit comprises said thermal insulator.

8. The aircraft tail cone assembly of any of paragraphs 1-6, wherein at least 75% of a surface area of said proximal end of said lighting unit comprises said thermal insulator.

9. The aircraft tail cone assembly of any of paragraphs 1-8, wherein said proximal end is an at least substantially flat surface.

10. The aircraft tail cone assembly of any of paragraphs 1-9, wherein said mounting flange comprises:
    a base, wherein a first surface of said base projects toward an interior of said lighting unit housing; and
    at least one support that extends from said base in a direction of said tail cone.

11. The aircraft tail cone assembly of paragraph 10, wherein said thermal insulator extends from said base in a direction of said tail cone, and wherein said thermal insulator occupies a space between at least one pair of supports of said at least one support.

12. The aircraft tail cone assembly of paragraph 10, wherein said at least one support comprises at least one pair of annular supports, with a first annular support of said at least one pair of annular supports being spaced inwardly from a second annular support of said at least one pair of annular supports, and with said thermal insulator being disposed between said first annular support and said second annular support of said at least one pair of annular supports.

13. The aircraft tail cone assembly of paragraph 12, wherein said first annular support and said second annular support each have a closed perimeter of any appropriate shape.

14. The aircraft tail cone assembly of any of paragraphs 10-13, wherein said lighting unit further comprises a printed circuit board disposed within said lighting unit, wherein said at least one light source is at least operatively interconnected with said printed circuit board, and wherein said thermal insulator and said printed circuit board are disposed on opposite sides of said base.

15. The aircraft tail cone assembly of paragraph 14, wherein said printed circuit board is disposed on said base.

16. The aircraft tail cone assembly of any of paragraphs 10-15, wherein said base and each said support are formed from a common material.

17. The aircraft tail cone assembly of paragraph 16, wherein said mounting flange and said lighting unit housing are formed from said common material.

18. The aircraft tail cone assembly of any of paragraphs 16-17, wherein said common material is at least one of a metal and a metal alloy.

19. The aircraft tail cone assembly of any of paragraphs 1-9, wherein said mounting flange comprises at least one open space that projects in a direction of said tail cone, and wherein said thermal insulator is disposed within said at least one open space of said mounting flange.

20. The aircraft tail cone assembly of any of paragraphs 1-9, wherein said mounting flange comprises at least one open space that projects in a direction of said tail cone, and wherein said thermal insulator is disposed within each open space of said at least one open space of said mounting flange.

21. The aircraft tail cone assembly of any of paragraphs 1-9, 19, and 20, wherein said lighting unit further comprises a printed circuit board disposed within said lighting unit, wherein said at least one light source is at least operatively interconnected with said printed circuit board, and wherein said thermal insulator is disposed between said printed circuit board and said tail cone.

22. The aircraft tail cone assembly of paragraph 21, wherein said mounting flange comprises a base, wherein said printed circuit board is disposed on a first surface of said base that projects toward an interior of said lighting unit housing, and wherein said thermal insulator extends from a second surface of said base that is opposite said first surface.

23. The aircraft tail cone assembly of any of paragraphs 1-22, wherein said at least one light source comprises an LED.

24. The aircraft tail cone assembly of any of paragraphs 1-23, further comprising:
    an auxiliary power unit disposed within said tail cone, wherein an exhaust from said auxiliary power unit is directed through at least one exhaust outlet of said tail cone, and wherein said lighting unit is in proximity to said at least one exhaust outlet.

25. An exterior aircraft lighting unit, comprising:
    a lighting unit housing comprising a mounting flange that in turn comprises at least one open space that projects in a direction of a supporting structure when said exterior aircraft lighting unit is mounted to the supporting structure;
    at least one light source disposed within an interior of said lighting unit housing;
    a cover for said lighting unit housing, wherein an output from said at least one light source is directed through said cover, and wherein said cover and said mounting flange are disposed on opposite ends of said exterior aircraft lighting unit; and a thermal insulator disposed within said at least one open space of said mounting flange, wherein said thermal insulator has a lower thermal conductivity than a thermal conductivity of said mounting flange.

26. The exterior aircraft lighting unit of paragraph 25, wherein said thermal conductivity of said thermal insulator is at least about 80 percent less than said thermal conductivity of said mounting flange.

27. The exterior aircraft lighting unit of paragraph 25, wherein said thermal conductivity of said thermal insulator is at least about 98 percent less than said thermal conductivity of said mounting flange.

28. The exterior aircraft lighting unit of any of paragraphs 25-27, wherein said mounting flange and said thermal insulator are formed from different materials.

29. The exterior aircraft lighting unit of any of paragraphs 25-28, wherein said lighting unit housing comprises at least one of a metal or a metal alloy.

30. The exterior aircraft lighting unit of any of paragraphs 25-29, wherein said exterior aircraft lighting unit comprises a proximal end, and wherein said proximal end comprises both said mounting flange and said thermal insulator.

31. The exterior aircraft lighting unit of paragraph 30, wherein at least 50% of a surface area of said proximal end comprises said thermal insulator.

32. The exterior aircraft lighting unit of paragraph 30, wherein at least 75% of a surface area of said proximal end comprises said thermal insulator.

33. The exterior aircraft lighting unit of any of paragraphs 31-32, wherein said proximal end is an at least substantially flat surface.

34. The exterior aircraft lighting unit of any of paragraphs 25-29, wherein said mounting flange comprises:

a base, wherein a first surface of said base projects toward said interior of said lighting unit housing; and at least one support extending from a second surface of said base in a direction that is away from said cover, and wherein said first surface and said second surface are oppositely disposed.

35. The exterior aircraft lighting unit of paragraph 34, wherein said thermal insulator occupies a space between at least one pair of supports of said at least one support.

36. The exterior aircraft lighting unit of any of paragraphs 34-35, further comprising a proximal end opposite said cover, wherein said proximal end comprises both said mounting flange and said thermal insulator, and wherein at least 50% of a surface area of said proximal end comprises said thermal insulator.

37. The exterior aircraft lighting unit of any of paragraphs 34-35, further comprising a proximal end opposite said cover, wherein said proximal end comprises both said mounting flange and said thermal insulator, wherein at least 75% of a surface area of said proximal end comprises said thermal insulator.

38. The exterior aircraft lighting unit of any of paragraphs 36-37, wherein said proximal end is an at least substantially flat surface.

39. The exterior aircraft lighting unit of any of paragraphs 34-38, wherein said exterior aircraft lighting unit further comprises a printed circuit board disposed within said interior of said lighting unit housing, and wherein said thermal insulator and said printed circuit board are disposed on opposite sides of said base.

40. The exterior aircraft lighting unit of paragraph 39, wherein said printed circuit board is disposed on said first surface of said base.

41. The exterior aircraft lighting unit of any of paragraphs 34-40, wherein said base and each support of said at least one support are formed from a common material.

42. The exterior aircraft lighting unit of paragraph 41, wherein said common material is at least one of a metal and a metal alloy.

43. The exterior aircraft lighting unit of any of paragraphs 34-42, wherein said mounting flange comprises said base.

44. The exterior aircraft lighting unit of any of paragraphs 25-43, wherein said lighting unit housing is an integral structure.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Any reference to "in accordance with various embodiments" in this Brief Description of the Drawings also applies to the corresponding discussion in the Detailed Description.

FIG. 4B is a side view of an attachment of the exterior aircraft lighting unit of FIGS. 3A-3E to an end section of the aircraft tail cone of FIG. 4A, in accordance with various embodiments.

FIG. 4C is an enlarged, side view of a portion of the view presented in FIG. 4B.

DETAILED DESCRIPTION

Figure 1A:
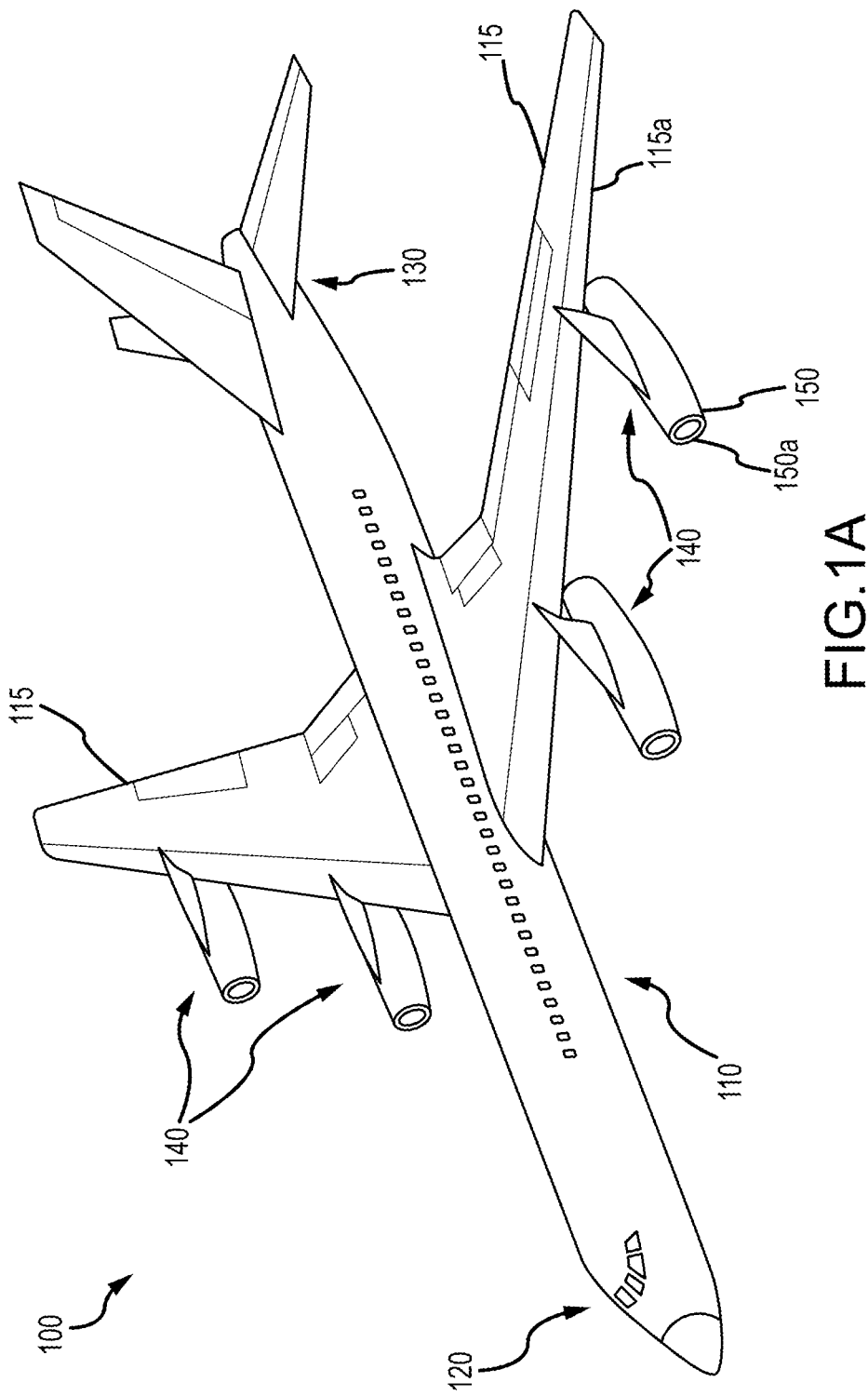
FIG. 1A is a perspective view of a representative aircraft, in accordance with various embodiments.

With reference to FIG. 1A, there is illustrated a representative aircraft 100 that may incorporate a lighting unit in accordance with FIGS. 3A-3E that will be discussed in more detail below. The aircraft 100 includes a fuselage 110 and wings 115. Each wing 115 has a corresponding leading edge 115a (e.g., a "leading" structure/surface of the corresponding wing 115 during movement of the aircraft 100 through the air). The fuselage 110 includes a cockpit 120 and a tail cone 130, which can be substantially integral to the fuselage 110. The aircraft 100 also includes engines 140 which can be affixed to the wings 115 and/or to the fuselage 110, and that may be controlled in any appropriate manner (e.g., by one or more control systems, for example one or more engine control systems). As used herein, the term "engine" is to be understood as including the engines themselves and nacelles 150 which contain the engines. Each nacelle 150 includes a leading edge 150a (e.g., a "leading" structure/surface of the nacelle 150 during movement of the aircraft 100 through the air). Although shown in FIG. 1A generally as a turbofan aircraft in which the engines 140 are gas turbine engines, it should be noted that the aircraft 100 can be any suitable type of aircraft having any suitable number of engines of any suitable type.

Figure 1B:
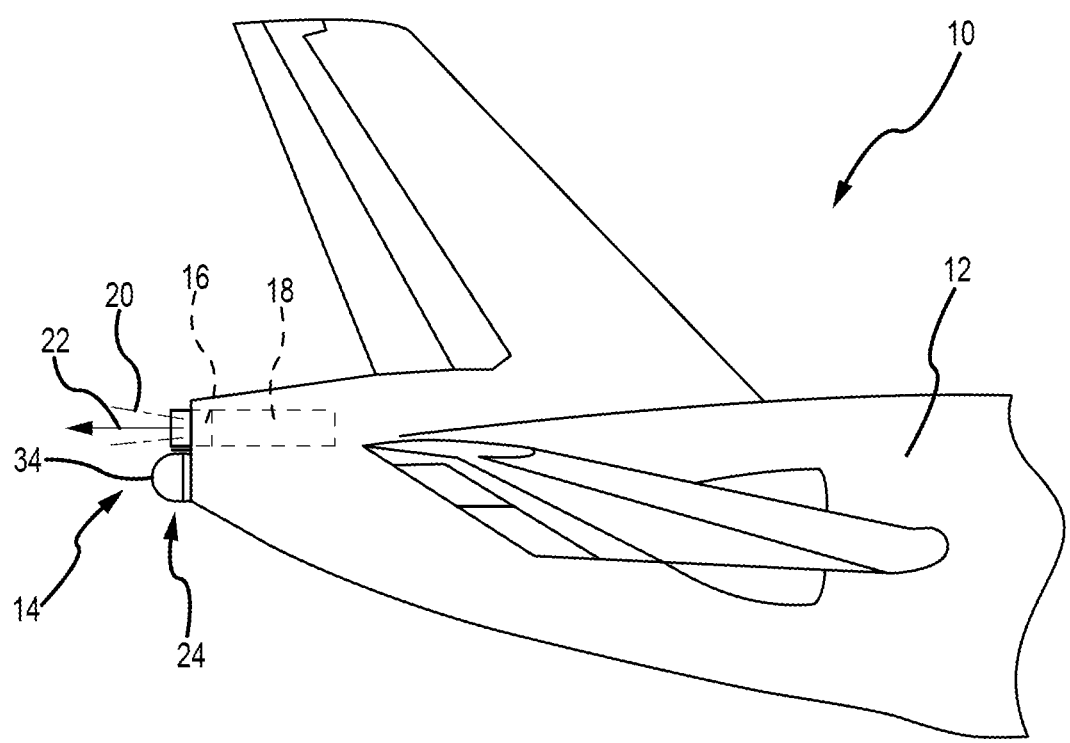
FIG. 1B is a side view of a tail portion of an aircraft provided with a tail light and an auxiliary power unit, in accordance with various embodiments.

FIG. 1B illustrates a tail portion 10 of an aircraft 12 having an external tail light 14 (e.g., at least one of a strobe light and a position light). The tail light 14 includes a cover or lens 34 and is located in close vicinity to the exhaust gas outlet 16 of an auxiliary power unit or APU 18 that ejects a fast and hot exhaust gas jet stream 20 through the exhaust gas outlet 16 in an ejecting direction 22.

Figure 1C:
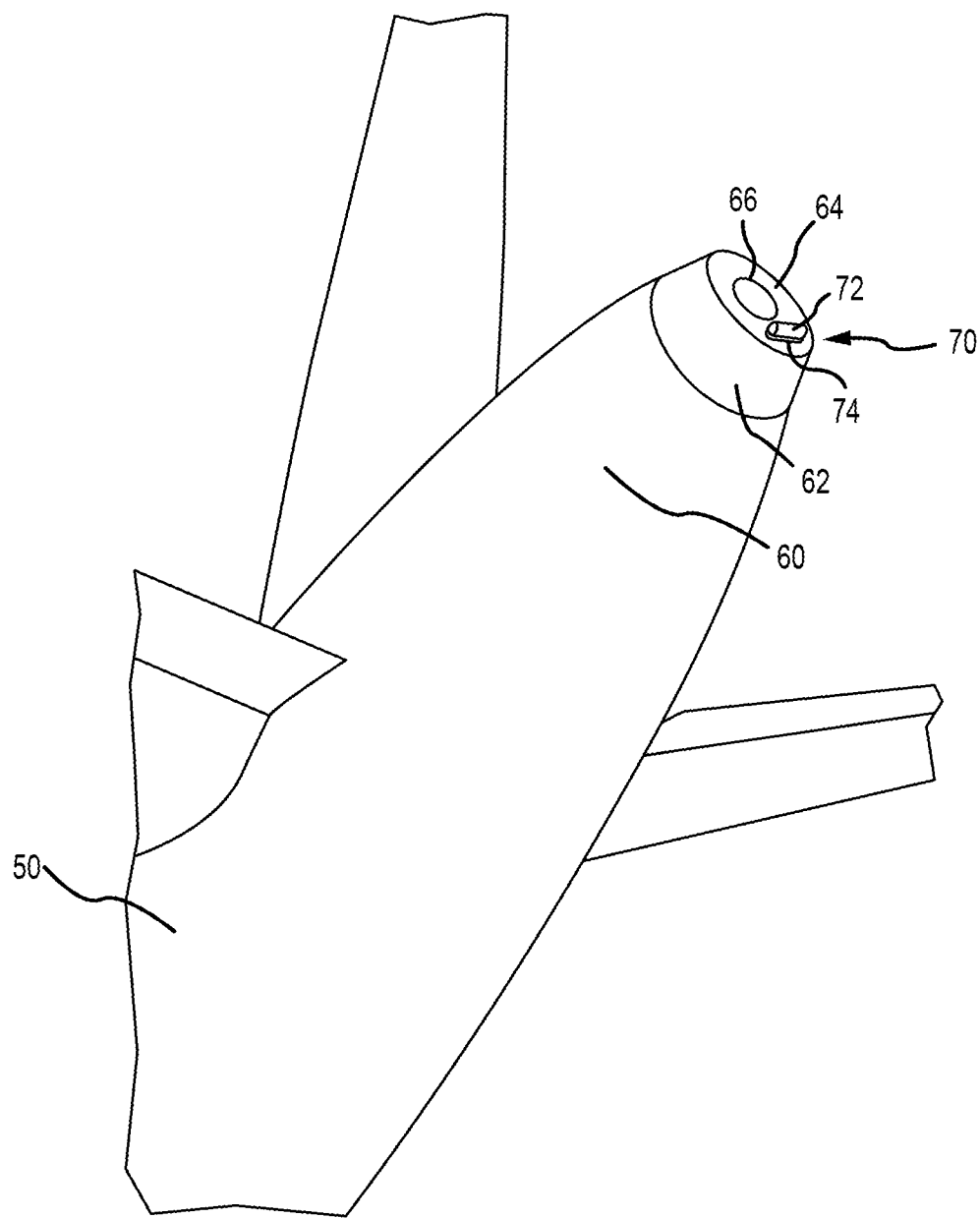
FIG. 1C is a perspective view of a tail cone of an aircraft, where the tail cone incorporates a tail light and is in accordance with various embodiments.

FIG. 1C illustrates a portion of a representative aircraft 50, namely a tail cone 60. A distal end of the tail cone 60 includes a discharge housing 62. This discharge housing includes an end section 64. This end section 64 includes an exhaust port, aperture, or outlet 66 through which an exhaust from an APU (within the tail cone 50) may be directed. An external lighting unit 70 (e.g., a tail light) is mounted to the end section 64 of the discharge housing 62 in proximity to the exhaust port 66. The lighting unit 70 includes a lighting unit housing 72 and a cover or lens 74. One or more light sources (not shown) are disposed within the interior of the lighting unit 70 and emit light through the cover 74.

Figure 2:
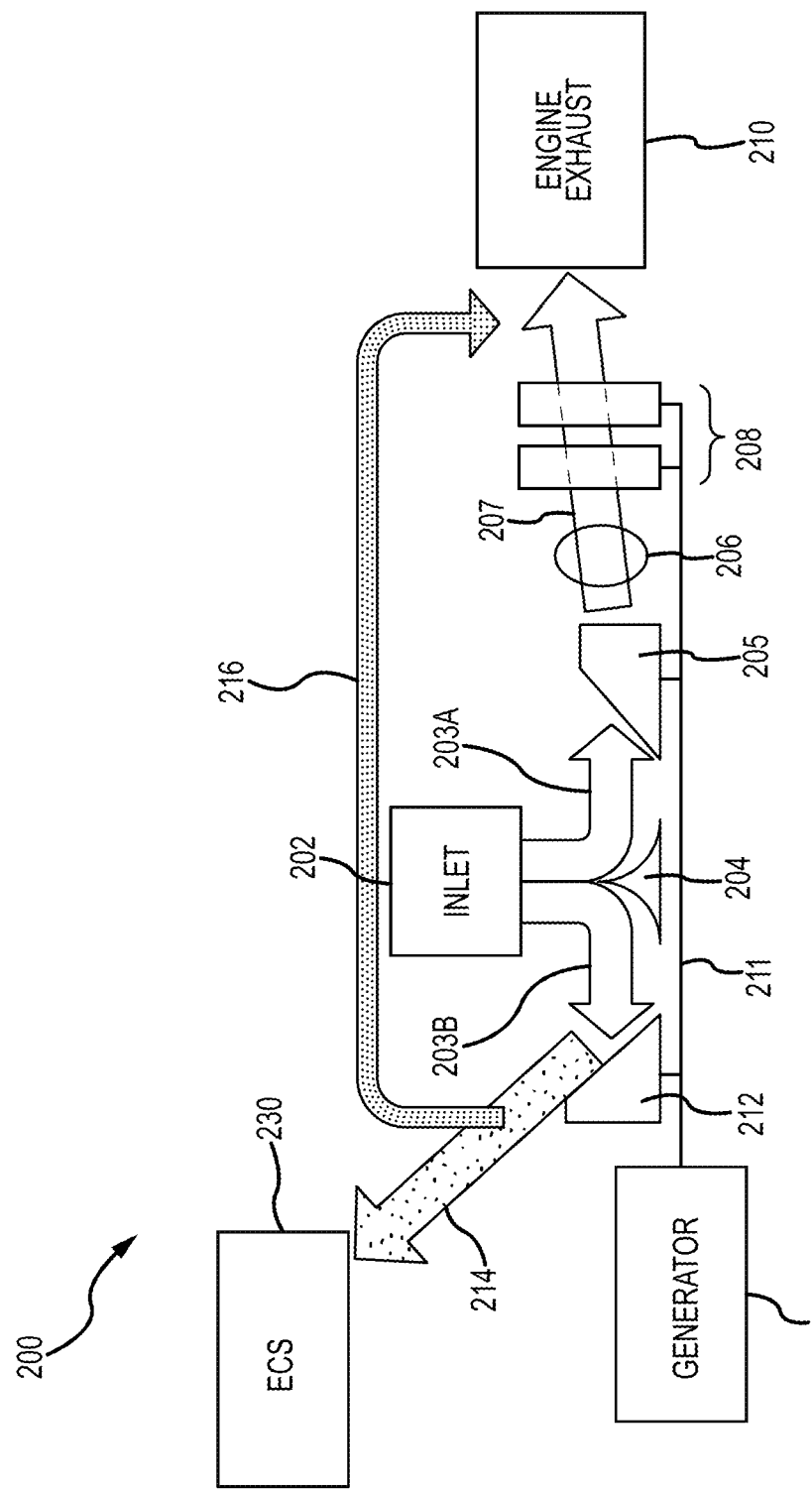
FIG. 2 is a schematic cross-sectional view of an auxiliary power unit, in accordance with various embodiments.

FIG. 2 illustrates a representative APU 200 (also referred to as an "auxiliary power system") that could be utilized by the aircraft 100 of FIG. 1A, the aircraft 10 of FIG. 1B, the aircraft 50 of FIG. 1C, or any other appropriate aircraft. The APU 200 includes a gas turbine engine for use on an aircraft to supply electric and pneumatic power to the aircraft systems as an auxiliary or secondary source of power. Any other suitable engine may be employed. As shown in FIG. 2, APU 200 includes an inlet 202 through which ambient air is drawn, a flow splitter 204 for splitting the inlet air into an engine stream air 203A and a load stream air 203B, a high pressure compressor (HPC) 205 for pressurizing the engine stream air 203A, a combustor 206 in which the compressed engine stream air 203A is mixed with fuel and ignited for generating an annular combustion stream 207 of hot combustion gases, and a turbine section 208 having turbines, for example, a two-stage turbine as shown in FIG. 2 or other multi-stage turbine, for extracting energy from the combustion gases which then exhaust to engine exhaust 210. The HPC 205, combustor 206 and turbine section 208 form part of the gas turbine engine portion of the APU 200. The gas turbine engine defines a gas path through which gases flow, such as engine stream air 203A and combustion stream 207, to drive the engine. A power shaft 211 is connected to one or more turbines of turbine section 208 and HPC 205. Power shaft 211 is driven by the one or more turbines of turbine section 208.

APU 200 further includes a load compressor (LDC) 212 for pressurizing the load stream air 203B to generate load compressor air 214 for use by an environment control system (ECS) 230 of an aircraft in which APU 200 is installed. ECS 230 may provide air supply, thermal control, and cabin pressurization in the aircraft. In various embodiments, LDC 212 may be linked mechanically to HPC 205 and turbine section 208 of the gas turbine engine by way of power shaft 211, and thus LDC 212 may be drivingly coupled to the gas turbine engine. APU 200 may also include a bypass excess air pathway or conduit establishing fluid communication between LDC 212 and the engine exhaust for directing at least some of excess load compressor air 216 to, in an example, an exhaust pathway to engine exhaust 210. Alternatively, the excess load compressor air 216 may be directed to another location upstream of one or more turbines of turbine section 208 in order to permit energy from the excess load compressor air 216 to be converted into useful work by the gas turbine engine of APU 200.

APU 200 may also be adapted to supply electric power to aircraft systems by way of a generator 220. Generator 220 may by an oil-cooled generator and include a gearbox for transferring power from power shaft 211 of APU 200 to electric power. In an example, generator 220 may operate at an least substantially constant speed.

In use, inlet 202 draws air into APU 200, and flow splitter 204 splits the inlet air into engine stream air 203A and load stream air 203B. Engine stream air 203A is directed to HPC 205. HPC 205 pressurizes the air by rotating. In combustor 206, the compressed engine stream air 203A is mixed with fuel and ignited, generating combustion stream 207 of hot combustion gases. Propulsion of combustion stream 207 through turbine section 208 rotates the turbines of turbine section 208, thus extracting energy from the combustion gases, and rotating power shaft 211 that is drivingly coupled to one or more turbines in turbine section 208. Combustion stream 207 then exits APU 200 as engine exhaust 210. Load stream air 203B is directed to LDC 212. In various embodiments in which LDC 212 is linked mechanically to HPC 205 and turbine section 208, for example, by way of power shaft 211, rotation of power shaft 211 drives the rotation of LDC 212. The rotation of LDC 212 compresses air within LDC 212, generating compressed load compressor air 214. The compressed load compressor air 214 may then be directed to ECS 230 of the aircraft. As such, APU 200 is adapted to supply load compressor air 214 for pneumatic power to ECS 230.

Load compressor air 214 generated by LDC 212 may be regulated by inlet guide vanes and bleed valves (not shown). However, since the rotation of LDC 212 may be mechanically linked to HPC 205, as HPC 205 rotates, so does LDC 212. In various embodiments, LDC 212 and HPC 205 rotate at the same speed. In some embodiments, LDC 212 and HPC 205 rotate at different speeds.

Thus, in various embodiments in which LDC 212 is mechanically linked to HPC 205, any time HPC 205 rotates LDC 212 will generate load compressor air 214. As shown in FIG. 2, if more load compressor air 214 is generated by LDC 212 than is required by ECS 230, unused excess load compressor air 216 may be released by a bleed valve (not shown) and directed along an exhaust pathway to be injected into engine exhaust 210. Rotation of power shaft 211 may also transfer power to the gearbox of generator 220 for electric power. The sizing of APU 200 may be determined by the requirements at the highest commanded generator 220 power and/or ECS 230 pneumatic power, leaving APU 200 running below its maximum power at other points of the operating envelope.

An exterior aircraft lighting unit is illustrated in FIG. 3A-3E, is identified by reference numeral 300, may be used in place of the external tail light 14 in FIG. 1B or the external lighting unit 70 of FIG. 1C, or may be installed on any appropriate aircraft and including where such an aircraft incorporates a tail cone with an APU and where the lighting unit 300 may be installed at any appropriate location on the tail cone and including in proximity to APU exhaust from the tail cone. In any case, the lighting unit 300 includes a lighting unit housing 310. Components of the light unit housing 310 include an annular sidewall 312, a base 314 (having a surface that projects toward an interior 320 of the housing 310 or more generally an interior of the lighting unit 300), and what may be characterized as a mounting flange 316. A plurality of supports or standoff 318 extend from the base 314 and terminate at a proximal or mounting end 322 of the lighting unit 300. The mounting flange 316 may include both the base 314 and the various supports 318. An outer perimeter of the base 314 may extend beyond an outer perimeter of the sidewall 312 (e.g., to allow one or more fasteners to be directed through the base 314 at a location that is beyond the outer perimeter of the sidewall 312, through a corresponding portion of a thermal insulator 340 to be discussed below, and into a tail cone of an aircraft). One of the supports 318 may extend about the entire outer perimeter of the base 314 (spaced outwardly relative to the sidewall 312) and may be characterized as an outer rim for the mounting flange 316.

The proximal end 322 of the lighting unit housing 310 (or more generally of the lighting unit 300) is oppositely disposed relative to a distal or light output end 324 of the lighting unit housing 310 (or more generally of the lighting unit 300). As will be discussed in more detail below, the proximal end 322 may be disposed in closely-spaced and/or interfacing relation with a tail cone of an aircraft that includes an APU.

Although the lighting unit housing 310 has been described in relation to having different portions or components (which could be separately formed and joined together in any appropriate manner for the above-noted arrangement), the lighting unit housing 310 may be of an integral or one-piece construction (e.g., without a joint between adjacent portions or components of the lighting unit housing 310). The lighting unit housing 310, including each of the noted portions/components thereof, may be formed from any appropriate material or combination of materials. One or more metals, one or more metal alloys, or any combination thereof may be used for the lighting unit housing 310, for instance aluminum (e.g., the entirety of the lighting unit housing 310 may be formed from aluminum). Any appropriate size, shape, and/or configuration may be utilized for the lighting unit housing 310, and thereby including sizes, shapes, and/or configurations different from the illustrated oval configuration of the sidewall 312 and more generally the lighting unit housing 310.

The supports 318 of the lighting unit housing 310 extend from one side of the base 314 (e.g., the supports 318 extending in a direction of a tail cone surface on which the lighting unit 300 is to be installed). One or more light sources (including an associated printed circuit board and/or other electronics) may be disposed on the opposite side of this base 314 and as will be discussed in more detail below. As such, the supports 318 may be characterized as providing a "standoff" function between the tail cone of an aircraft and the base 314 of the lighting unit 300 (when the lighting unit 300 is installed on an exterior of the aircraft, such as on an end or end surface of a tail cone).

One or more thermal insulators 340 extend from the same side of the base 314 of the lighting unit housing 310 as the above-noted supports or standoffs 318 (e.g., the thermal insulators 340 extending in a direction of a tail cone surface on which the lighting unit 300 is to be installed). The thermal insulators 340 may be formed from a different material than at least the supports/standoffs 318 (or from a different material than the entirety of the lighting unit housing 310). Representative materials for the thermal insulators 340 include without limitation a mica-based laminate (e.g., Cogetherm®), E60 Glass/Epoxy technical composite, Pyrotek NAD 500, and the like. Generally, the thermal insulators 340 may be of a material having a low thermal conductivity and a high compressive strength, including at elevated operating temperatures (e.g., 250° C.-350° C.). Each thermal insulator 340 may have a lower thermal conductivity than a thermal conductivity of the supports/standoffs 318 (or more generally a lower thermal conductivity than a thermal conductivity of the mounting flange 316). The thermal conductivity of the thermal insulators 340 may be at least about 80 percent less than the thermal conductivity of the supports/standoffs 318 (or the entirety of the mounting flange 316, or the entirety of the lighting unit housing 310, or both) in various embodiments, and may be at least about 98 percent less than the thermal conductivity of the supports/standoffs 318 (or the entirety of the mounting flange 316, or the entirety of the lighting unit housing 310, or both) in various embodiments.

The proximal or mounting end 322 of the lighting unit 300 includes a proximal or terminal end of each support/standoff 318, as well as a proximal or terminal end of each thermal insulator 340. The proximal end 322 of the lighting unit 300 may be an at least substantially flat surface. At least 50% of a surface area of the proximal end 322 may be collectively defined by the thermal insulators 340 in various embodiments. At least 75% of a surface area of the proximal end 322 may be collectively defined by the thermal insulators 340 in various embodiments. In either case, the existence of the thermal insulator(s) 340 on the proximal or mounting end 322 of the lighting unit 300 reduces the contact between the mounting flange 316 (that includes the supports/standoffs 318) and the structure to which the lighting unit 300 is mounted (e.g., a tail cone of an aircraft).

Figure 3A:
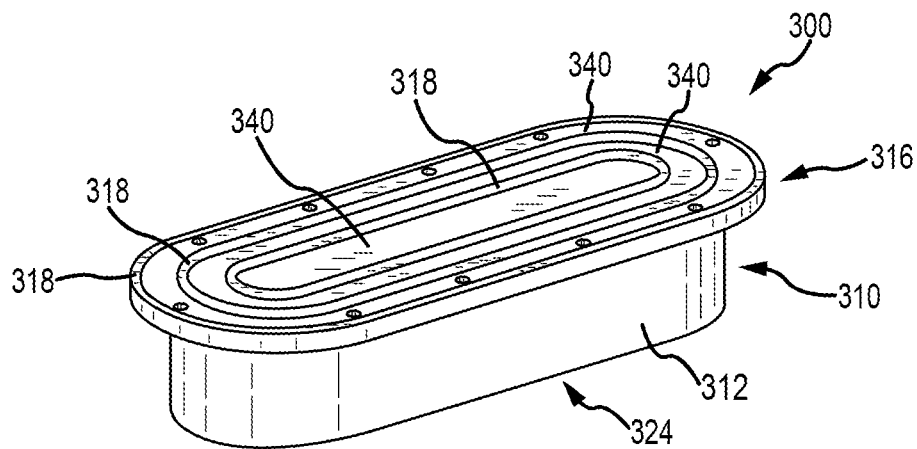
FIG. 3A is a perspective view of an exterior aircraft lighting unit, in accordance with various embodiments.
Figure 3B:
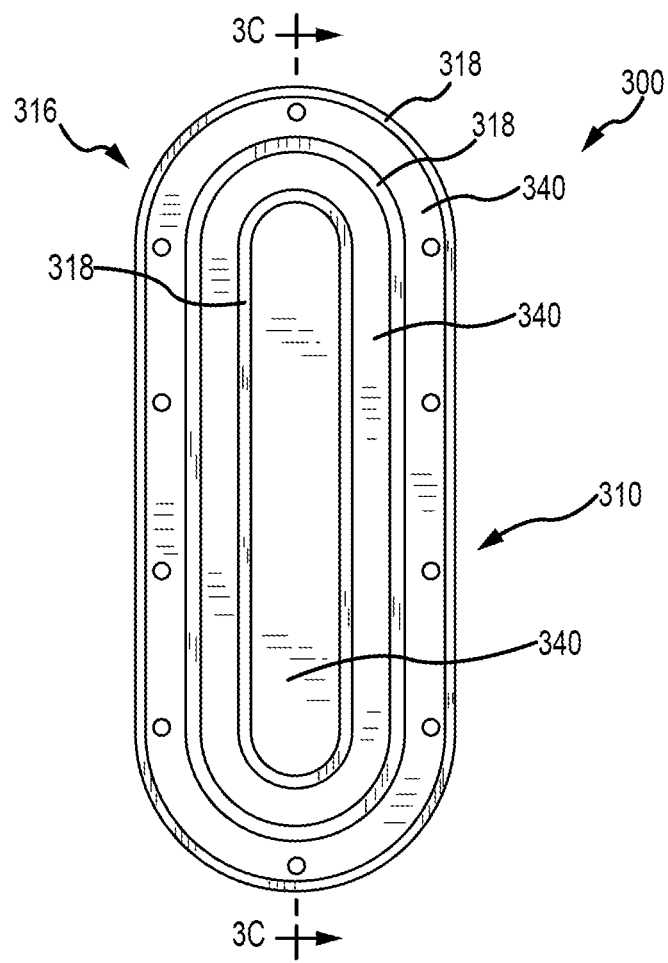
FIG. 3B is a plan view of a proximal or mounting end of the exterior aircraft lighting unit of FIG. 3A, in accordance with various embodiments.
Figure 3D:
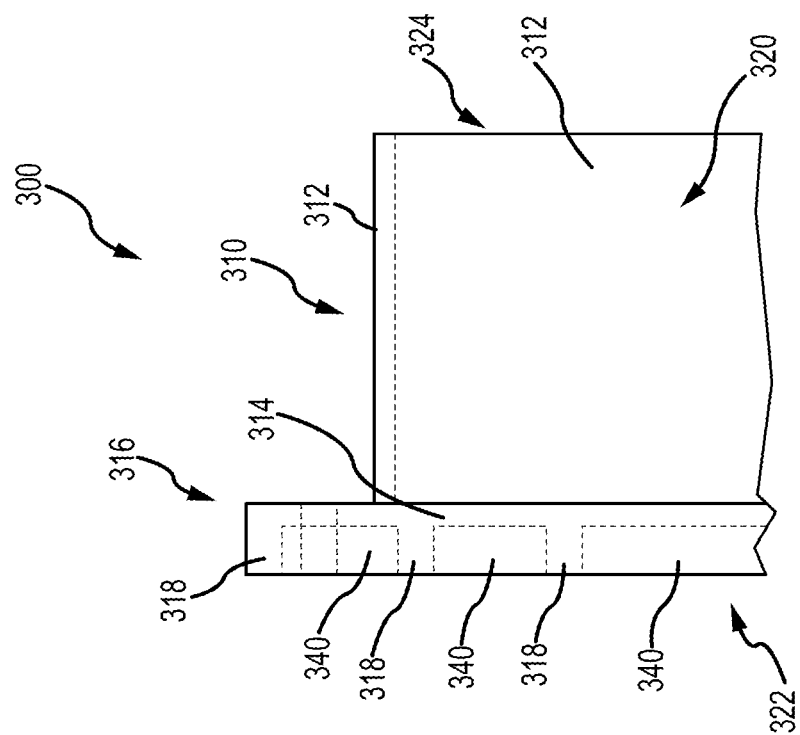
FIG. 3D is an enlarged, side view of a portion of the view presented in FIG. 3C, in accordance with various embodiments.
Figure 3C:
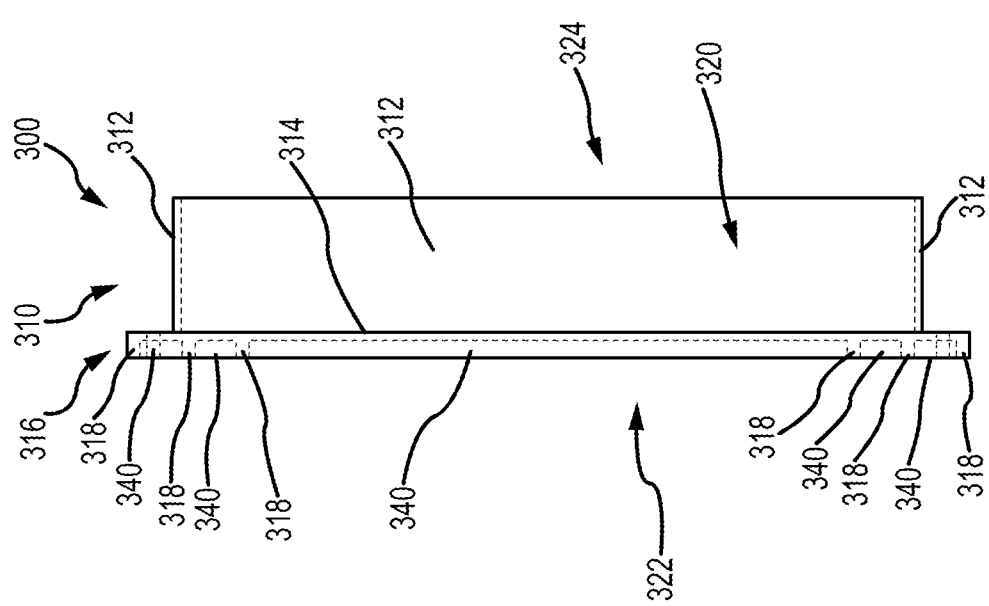
FIG. 3C is a side view of the exterior aircraft lighting unit of FIG. 3A, in accordance with various embodiments.

Generally, the mounting flange 316 may be characterized as being in the form of a plurality of supports/standoffs 318 that are disposed in spaced relation to one another, with a thermal insulator 340 occupying each of these open spaces between the various supports/standoffs 318. FIGS. 3A and 3B show the supports/standoffs 318 as being annular structures, although each support/standoff 318 may be of any appropriate size, shape, and/or configuration (e.g., each support/standoff 318 could be in the form of a post or the like). "Annular" in relation to the supports/standoffs 318 simply means that a given support/standoff 318 extends a full 360° about a common point or location or has a "closed perimeter." Although the supports/standoffs 318 are illustrated as being of an oval-shape, other shapes of annular structures for the supports/standoffs 318 may be utilized (e.g., square, rectangular, round). Although the supports/standoffs 318 are illustrated as being "concentrically" disposed, non-concentrically disposed arrangements for annular supports/standoffs 318 are also within the scope of this disclosure. The supports/standoffs 318 may be formed in any appropriate manner, including by machining a closed end of the lighting unit housing 310 that will end up defining both the supports 318 and the noted base 314. In any case, a thermal insulator 340 is disposed between each adjacent pair of supports/standoffs 318.

The lighting unit 300 may be mounted to a structure (e.g., a tail cone of an aircraft) in any appropriate manner. One or more fasteners may be directed through the mounting flange 316 of the lighting unit housing 310 (e.g., a portion of the base 314 that extends beyond the outer perimeter of the sidewall 312) and into engagement (e.g., threadable engagement) with a given structure (e.g., an aircraft tail cone). One or more fasteners may in fact also extend through an aligned thermal insulator 340. In addition to the noted thermal properties, the thermal insulator 340 may also exhibit an acceptable compressive strength, for instance a compressive strength of at least about 225 MPA in various embodiments, and/or a compressive strength of at least about 350 MPA in various embodiments (e.g., Cogetherm® having a compressive strength of 250 MPa). The thermal insulator 340 may also allow for a reduction in the overall weight of the lighting unit 300. The thermal insulator 340 may have a reduced density compared to a density of the lighting unit housing 310, for instance the density of the thermal insulator 340 may be at least 20 percent less than a density of the lighting unit housing 310 in various embodiments, and/or the density of the thermal insulator 340 may be at least 30 percent less than a density of the lighting unit housing 310 in various embodiments (e.g., Cogetherm® having a density of 2.15 g/cm$^3$, versus aluminum (e.g., a potential material for the lighting unit housing 310) which has a density of 2.7 g/cm$^3$)).

Figure 3E:
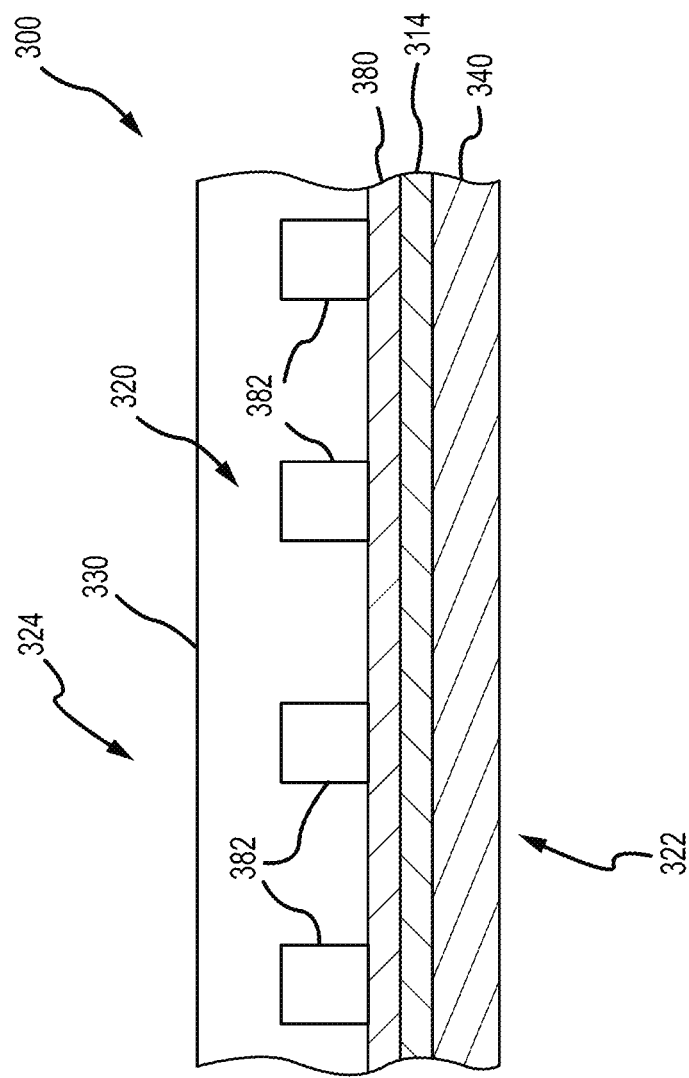
FIG. 3E is a cross-sectional schematic of a portion of the aircraft lighting unit of FIGS. 3A-3D, in accordance with various embodiments.

FIG. 3E illustrates a portion of the interior 320 of the lighting unit 300 taken along line 3C-3C of FIG. 3B, and within the most inwardly-disposed annular support/standoff 318 shown in FIGS. 3A and 3B. A printed circuit board 380 is disposed on a side of the base 314 of the lighting unit housing 310 that is opposite of the side of the base 314 from which the supports/standoffs 318 and thermal insulators 340 extend (e.g., the printed circuit board 380 is disposed on a surface of the base 314 that projects toward the interior 320 of the lighting unit housing 310). Stated another way, the base 314 is disposed between the printed circuit board 380 and collectively the thermal insulators 340 and the supports 318. One or more light sources 382 may be positioned on the printed circuit board 380, may be operatively interconnected with the printed circuit board 380, or both. Each light source 382 may be of any appropriate size, shape, configuration, and/or type, for instance a light-emitting diode or LED. FIG. 3E also illustrates a cover or lens 330 that is positioned on/defines the distal or light output end 324 of the lighting unit 300 and that may be of any appropriate shape on the exterior of the lighting unit 300. Light from operation of one or more of the light sources 382 is directed through the cover or lens 330 (e.g., the cover or lens 330 may be formed from any appropriate transparent material or combination of transparent materials).

Figure 4A:
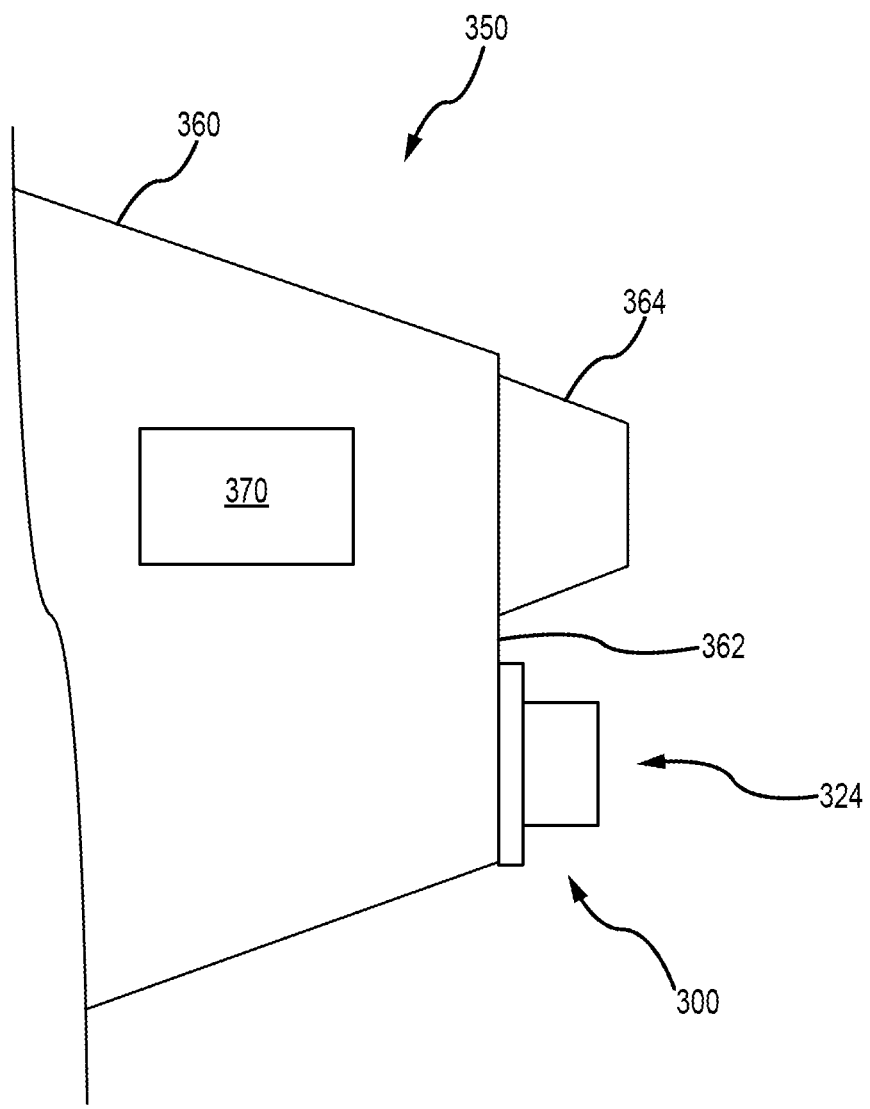
FIG. 4A is a schematic side view of an aircraft tail cone with an auxiliary power unit and the aircraft lighting unit of FIGS. 3A-3E, in accordance with various embodiments.

FIG. 4A-4C illustrates a representative mounting or attachment of the external lighting unit 300 of FIG. 3A-3E to an aircraft. An aircraft tail cone assembly 350 includes a tail cone 360 of an aircraft (e.g., aircraft 100 of FIG. 1A; aircraft 10 of FIG. 1B; aircraft 50 of FIG. 1C), along with the above-described exterior aircraft lighting unit 300. An APU 370 of any appropriate size, shape, configuration, and/or type (e.g., APU 200 of FIG. 2) is disposed within the interior of the tail cone 360. Exhaust from the APU 370 is discharged from the tail cone 360 through an APU exhaust 364 on an end section (or a tail cone surface) 362 of the tail cone 360. The lighting unit 300 is mounted to the end section 362 of the tail cone 360 at least somewhat in proximity to the APU exhaust 364.

Exhaust from the APU 370 heats the tail cone 360 of the associated aircraft. The lighting unit 300 reduces conductive heat transfer between the tail cone 360 and the lighting unit housing 310 (particularly the printed circuit board 380 within the interior 320 of the lighting unit 300 and the associated light source(s) 382). This reduction of conductive heat transfer may be characterized as being provided by the reduced contact between the lighting unit housing 310 (more specifically the mounting flange 316) and the end section 362 of the tail cone 360. That is, incorporating the thermal insulator(s) 340 on the proximal or mounting end 322 of the lighting unit 300 reduces the conductive heat transfer from the tail cone 360 to the lighting unit housing 310 (more specifically reduces the conductive heat transfer from the tail cone 360 to the mounting flange 316 and including its base 314), and including reducing the conductive heat transfer from the tail cone 360 to the printed circuit board 380 and the associated light source(s) 382 (the conductive heat transfer being through the lighting unit housing 310, more specifically being through the mounting flange 316). Heating of the printed circuit board 380 may adversely impact one or more coatings (e.g., a parylene coating, which may be subject to evaporation due to exposure to elevated temperatures) and that in turn may adversely impact performance of the printed circuited board 380 and the associated lighting source(s) 382.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft tail cone assembly, comprising:
a tail cone; and
a lighting unit mounted on said tail cone, wherein said lighting unit comprises:
 a lighting unit housing;
 at least one light source disposed within said lighting unit;
 a proximal end in at least one of closely-spaced or interfacing relation with said tail cone;
 a mounting flange including a base and at least one support that extends from said base in a direction of said tail cone, a first surface of said base projects toward an interior of said lighting unit housing, and said proximal end comprises said mounting flange; and
 a thermal insulator extending from said base in a direction of said tail cone, said thermal insulator occupies a space between at least one pair of supports of said at least one support, wherein said proximal end further comprises said thermal insulator, wherein said thermal insulator has a lower thermal conductivity than a thermal conductivity of said mounting flange.

2. The aircraft tail cone assembly of claim 1, wherein said thermal conductivity of said thermal insulator is at least about 80 percent less than said thermal conductivity of said mounting flange.

3. The aircraft tail cone assembly of claim 1, wherein said mounting flange and said thermal insulator are formed from different materials.

4. The aircraft tail cone assembly of claim 1, wherein at least 50% of a surface area of said proximal end of said lighting unit comprises said thermal insulator.

5. The aircraft tail cone assembly of claim 1, wherein said lighting unit further comprises a printed circuit board disposed within said lighting unit, wherein said at least one light source is at least operatively interconnected with said printed circuit board, and wherein said thermal insulator and said printed circuit board are disposed on opposite sides of said base.

6. The aircraft tail cone assembly of claim 1, wherein said mounting flange comprises at least one open space that projects in a direction of said tail cone, and wherein said thermal insulator is disposed within each open space of said at least one open space of said mounting flange.

7. The aircraft tail cone assembly of claim 1, wherein said lighting unit further comprises a printed circuit board disposed within said lighting unit, wherein said at least one light source is at least operatively interconnected with said printed circuit board, and wherein said thermal insulator is disposed between said printed circuit board and said tail cone.

8. The aircraft tail cone assembly of claim 7, wherein said mounting flange comprises a base, wherein said printed circuit board is disposed on a first surface of said base that projects toward an interior of said lighting unit housing, and wherein said thermal insulator extends from a second surface of said base that is opposite said first surface.

9. The aircraft tail cone assembly of claim 1, further comprising:
an auxiliary power unit disposed within said tail cone, wherein an exhaust from said auxiliary power unit is directed through at least one exhaust outlet of said tail cone, and wherein said lighting unit is in proximity to said at least one exhaust outlet.

10. An exterior aircraft lighting unit, comprising:
a lighting unit housing comprising a mounting flange that in turn comprises at least one open space that projects in a direction of a supporting structure when said exterior aircraft lighting unit is mounted to the supporting structure;
at least one light source disposed within an interior of said lighting unit housing;
a cover for said lighting unit housing, wherein an output from said at least one light source is directed through said cover, and wherein said cover and said mounting flange are disposed on opposite ends of said exterior aircraft lighting unit;

a thermal insulator disposed within said at least one open space of said mounting flange, wherein said thermal insulator has a lower thermal conductivity than a thermal conductivity of said mounting flange; and a printed circuit board disposed within said interior of said lighting unit housing wherein said mounting flange comprises:

a base, wherein a first surface of said base projects toward said interior of said lighting unit housing, and said thermal insulator and said printed circuit board are disposed on opposite sides of said base; and at least one support extending from a second surface of said base in a direction that is away from said cover, and wherein said first surface and said second surface are oppositely disposed.

11. The exterior aircraft lighting unit of claim 10, wherein said thermal conductivity of said thermal insulator is at least about 80 percent less than said thermal conductivity of said mounting flange.

12. The exterior aircraft lighting unit of claim 10, wherein said exterior aircraft lighting unit comprises a proximal end, and wherein said proximal end comprises both said mounting flange and said thermal insulator.

13. The exterior aircraft lighting unit of claim 12, wherein at least 50% of a surface area of said proximal end comprises said thermal insulator.

14. The exterior aircraft lighting unit of claim 13, wherein said proximal end is an at least substantially flat surface.

15. The exterior aircraft lighting unit of claim 10, wherein said thermal insulator occupies a space between at least one pair of supports of said at least one support.

16. The exterior aircraft lighting unit of claim 10, further comprising a proximal end opposite said cover, wherein said proximal end comprises both said mounting flange and said thermal insulator, and wherein at least 50% of a surface area of said proximal end comprises said thermal insulator.

* * * * *